United States Patent [19]
Yoshikawa

[11] Patent Number: 5,868,113
[45] Date of Patent: Feb. 9, 1999

[54] ENGINE COMBUSTION CHAMBER AND AIR INTAKE DEVICE

[75] Inventor: Masaaki Yoshikawa, Iwata, Japan

[73] Assignee: Yamaha Hatsudoki Kabushiki Kaisha, Iwata, Japan

[21] Appl. No.: 354,539

[22] Filed: Dec. 13, 1994

Related U.S. Application Data

[63] Continuation-in-part of Ser. No. 197,610, Feb. 17, 1994.

[30] Foreign Application Priority Data

Feb. 19, 1993 [JP] Japan ................................. 5-030597

[51] Int. Cl.$^6$ ................................................ F02B 31/08
[52] U.S. Cl. .................... 123/308; 123/90.22; 123/90.27
[58] Field of Search ................................. 123/308, 432, 123/90.22, 90.27

[56] References Cited

U.S. PATENT DOCUMENTS

| | | | |
|---|---|---|---|
| 4,995,359 | 2/1991 | Yokoyama et al. | 123/188 M |
| 5,012,783 | 5/1991 | Ferrazzi | 123/432 |
| 5,095,858 | 3/1992 | Ascari | 123/308 |
| 5,099,812 | 3/1992 | Yamada | 123/432 |

FOREIGN PATENT DOCUMENTS

| | | |
|---|---|---|
| 344598 | 12/1989 | European Pat. Off. . |
| 542264 | 5/1993 | European Pat. Off. . |
| 595316 | 5/1994 | European Pat. Off. . |
| 611883 | 8/1994 | European Pat. Off. . |

OTHER PUBLICATIONS

European Search Report dated Jul. 19, 1995. Patent Abstracts of Japan, vol. 11 No. 14 (M–553) 14 Jan. 1987 & JP–A–61 190147 (Toyota) 23 Aug. 1986.

Primary Examiner—Erick R. Solis
Attorney, Agent, or Firm—Knobbe, Martens, Olson & Bear LLP

[57] ABSTRACT

A five-valve per cylinder internal combustion engine having a lens shaped combustion chamber that promotes a high compression ratio and which also reduces the likelihood of knocking. The engine includes a cylinder head having three intake valves disposed substantially on one side of a plane containing the cylinder bore axis and a pair of exhaust valves supported for reciprocation on the other side of the plane. The intake valves are disposed at acute angles to a plane containing the cylinder bore axis and containing the axis of rotation of the camshaft. The center of these poppet valves is disposed of on a plane also containing the cylinder bore axis and perpendicular to the first plane, while the remaining intake valves are disposed at opposite acute angles to this plane. The poppet valves are actuated by a camshaft journaled in bearing surfaces formed directly in the cylinder head and through tappets that are supported in bores formed integrally in the cylinder head. The bolting arrangement for the cylinder head and camshaft bearing caps facilitates machining and simplifies assembly. The timing of the drive of the camshaft for operating the intake valves can also be varied relative to the rotational position of the crankshaft so as to reduce or preclude knocking.

24 Claims, 5 Drawing Sheets

ENGINE COMBUSTION CHAMBER AND AIR INTAKE DEVICE

CROSS-REFERENCE NO RELATED APPLICATION

This application is a continuation-in-part of my copending application entitled ENGINE AIR INTAKE DEVICE, Ser. No. 08/197,610, filed Feb. 17, 1994 and assigned to the Assignee hereof.

BACKGROUND OF THE INVENTION

This invention relates to an engine combustion chamber and air intake device and more particular to an improved cylinder head and porting arrangement for an internal combustion engine.

The use of multiple intake valves for internal combustion engines is well known as an expedient for improving engine performance. Although four valve per cylinder engines (using two intake valves per cylinder) are common, there is an advantage to employing three intake valves and two exhaust valves for a total of five valves per cylinder. However, when five valves per cylinder are employed it is difficult to maintain low combustion chamber surface areas and high compression ratios. The reason for this is that the valve placement and the requirement to clear the head of the piston and permit adequate valve opening give rise to difficulties in obtaining the low combustion chamber surfaces and volumes necessary to achieve high performance and high compression ratios. As is disclosed in my U.S. Pat. No. 4,660,529 entitled 4-CYCLE ENGINE, issued Apr. 28, 1987 and now reissued as RE 33787 on Jan. 7, 1994, it is possible through placement of the intake valves as generally disclosed in that patent to obtain high compression ratios and still utilize five valves per cylinder.

It is a principal purpose of this invention to provide an improved combustion chamber configuration that permits still further increases in the compression ratio without increasing the likelihood of knocking.

It is a further object of this invention to provide an improved combustion chamber configuration and intake port arrangement for a five valve per cylinder engine.

When using multiple valves it is the common practice to provide a pair of valves serving related ports that are disposed on one side of a plane containing the axis of the cylinder bore and wherein the valves reciprocate about reciprocal axes that are disposed at an acute angle to this plane. In order to increase the amount of valve lift without decreasing the compression ratio it has also been the practice to incline the valve stems and associated ports to a plane that is perpendicular to the first-mentioned plane and which also passes through the cylinder bore axis. The valves are disposed at opposite acute angles to this plane. As a result of this construction, when the valves serve the intake function, the flow which enters the chamber through the individual valves will tend to intersect in the cylinder bore. This has certain disadvantages. Specifically, it is not always possible to provide the desired flow pattern in the cylinder bore and interfering turbulence may occur.

The use of two intake valves disposed as in the preceding paragraph is also used in combination with engines having three intake valves per cylinder. The two valves having the disposition disclosed form side intake valves and a center intake valve is disposed between these two side intake valves and closer to the outer periphery of the cylinder bore on the side opposite the first plane. Again, this can result in undesired air flow in the combustion chamber and particularly turbulence or interference in the air flows from the individual intake passages.

It is, therefore, a further principle object of this invention to provide an improved engine air intake device.

It is a further object of this invention to provide an improve valve placement for an engine wherein large valve lifts can be accomplished without reducing the compression ratio and without causing interfering flow between the individual intake passages.

It is a still further object of this invention to provide an improve valve and associated passage arrangement for the cylinder head of an internal combustion engine.

When multiple valves are employed per cylinder in an engine, the construction of the cylinder head and valve actuating mechanism tends to become rather complicated. This can give rise to other problems such as problems in correctly locating the fastening hold-down bolts for the cylinder head.

That is, it is desirable to provide substantially uniform spacing around the cylinder bore for the cylinder head hold-down bolts and with multiple valve arrangements this can be at time difficult.

It is, therefore, a still further object of this invention to provide an improved hold-down bolt pattern for the cylinder head of a multiple valve internal combustion engine.

It is a still further object of this invention to provide an improved bolting arrangement for such an engine.

The valves are normally operated by one or, more frequently, two overhead mounted camshafts. These camshafts may be journaled directly in the cylinder head or in components which form a portion of the cylinder head assembly. This requires a provision of additional bearing caps for journaling the cylinder head and at times the bearing arrangement and hold-down fasteners for the bearing caps can interfere with or obscure the hold-down bolts for the cylinder head itself.

It is, therefore, a still further object of this invention to provide an improved hold-down arrangement for a cylinder head of an overhead camshaft internal combustion engine.

It is a further object of this invention to provide an improved hold-down arrangement for the bearing caps of overhead mounted camshafts and the cylinder head of the engine wherein the hold-down fasteners can be conveniently formed and machining operations are simplified.

Because of the problems mentioned in connection with the complexity of multiple valve overhead valve cylinder heads, it has been at times the practice to employ a cylinder assembly that is made up of a number of castings that are secured to each other. Of course, as the number of pieces increases, the bolting arrangement, machine and cost of the cylinder head can become larger.

It is, therefore, a still further object of this invention to provide an improve cylinder head assembly for a multiple cam multiple valve engine wherein the cylinder head may be made of a single piece construction and yet afford ease of assembly and manufacturing.

SUMMARY OF THE INVENTION

A first feature of this invention is adapted to be embodied in an internal combustion engine which comprises a cylinder block having a cylinder bore in which a piston reciprocates. A cylinder head is affixed to the cylinder block and has a recessed surface that faces the head of the piston and which with the head of the piston defines a combustion chamber which, at top dead center, is configured like an optical lens. In this cylinder head surface there are provided, on substantially one side of a plane containing the axis of the cylinder bore, three intake valve seats comprised of a pair of side intake valve seats which extend in part over the plane and a center intake valve seat which is faced further from the plane than the side intake valve seats. A pair of poppet type intake valves are slidably supported within the cylinder head for reciprocation along axes that lie in a common plane that is disposed at an acute angle to the plane containing the cylinder bore axis and control the flow through the side intake valve seats. A third poppet type intake valve is slidably supported within the cylinder head for reciprocation along an axis that is also disposed at an acute angle to the plane containing the cylinder bore axis but which is lesser than the acute angle of the plane containing the axes of the first pair of intake valves. A pair of exhaust valve seats are formed in the other side of the cylinder head recess. A pair of exhaust valves are slidably supported within the cylinder head and control the flow through the exhaust valve seats.

A second feature of the invention is adapted to be embodied in an internal combustion engine comprised of a cylinder block that defines a cylinder bore in which a piston reciprocates. A crankshaft is journaled for rotation about an axis at one end of the cylinder bore and is driven by the piston. A cylinder head is affixed to the cylinder block and closes the other end of the cylinder bore. A pair of intake passages are formed in the cylinder head and terminate at a pair of valve seats lying on opposite sides of a first plane containing the axis of the cylinder bore and extending perpendicular to the axis of rotation of the crankshaft. A pair of poppet valves are supported for reciprocation about respectively reciprocal axes by the cylinder head and have head portions for controlling the flow through the valve seats. The poppet valve axes lie at acute angles to a second plane containing the cylinder bore axis and perpendicular to the first plane and at respective opposite acute angles to the first plane. The axes intersect in the second plane at a point below the bottom dead center position of the piston.

A fourth of the invention is adapted to be embodied in a cylinder head assembly for an internal combustion engine having at least three valve seat lying substantially on one side of a first plane passing through the cylinder bore axis and a pair of valve seats disposed on the opposite side of the first plane. Three poppet-type valves are reciprocally supported by the cylinder head and control the opening and closing of the first valve seats. These three valves are operated by a first camshaft rotatably journaled by the cylinder head assembly on the one side of the first plane. A pair of poppet valves are supported for reciprocation in the cylinder head assembly on the other side of the plane and control the flow through the pair of valve seats. This pair of poppet valves is operated by a second camshaft rotatably journaled by the cylinder head assembly on the other side of the first plane. The first camshaft axis is disposed closer to the first plane than the second camshaft axis. A first pair of threaded fasteners are disposed outwardly of the first camshaft axis relative to the first plane for fastening the cylinder head assembly to an associated cylinder block. A second pair of fasteners are disposed beneath the second cam shaft for affixing the cylinder head assembly to an associated cylinder block.

A third feature of the invention is adapted to be embodied in a cylinder head assembly that has three valve seats disposed substantially on one side of a plane containing the axis of the associated cylinder bore. Three poppet valves are supported for reciprocation about the respective reciprocal axes by the cylinder head and have head portions that control the flow through the valve seats. A camshaft has three cam lobes for operating each of the poppet valves. Bearing portions are formed between the cam lobes and are rotatably journaled in corresponding bearing surfaces formed in the cylinder head. A bearing cap is affixed to the cylinder head and has bearing surfaces that cooperate with the cylinder head and camshaft bearing surfaces for rotatably journaling the camshaft for rotation about an axis that extends substantially parallel to the plane. A pair of cylinder head hold-down fasteners affix the cylinder head to an associated cylinder block. These fasteners are disposed axially beyond the ends of the bearing cap and transversely outwardly of the camshaft from the plane.

A fifth feature of the invention is also adapted to be embodied in a cylinder head for an internal combustion engine which cylinder head has three valve seats lying substantially on one side of the plane containing the axis of the bore of the associated cylinder block. Three poppet-type valves are supported for reciprocation by the cylinder head for controlling the flow through the valve seats. A single camshaft having three cam lobes is rotatably journaled in the cylinder head for operating the poppet valves. Thimble-type tappets are slidably supported within bores formed directly in the cylinder head for transmitting motion from the camshaft to tappet-type valve. The bearing surfaces for the camshaft are also formed directly in the cylinder head.

DETAILED DESCRIPTION OF THE PREFERRED EMBODIMENTS

Figure 1:
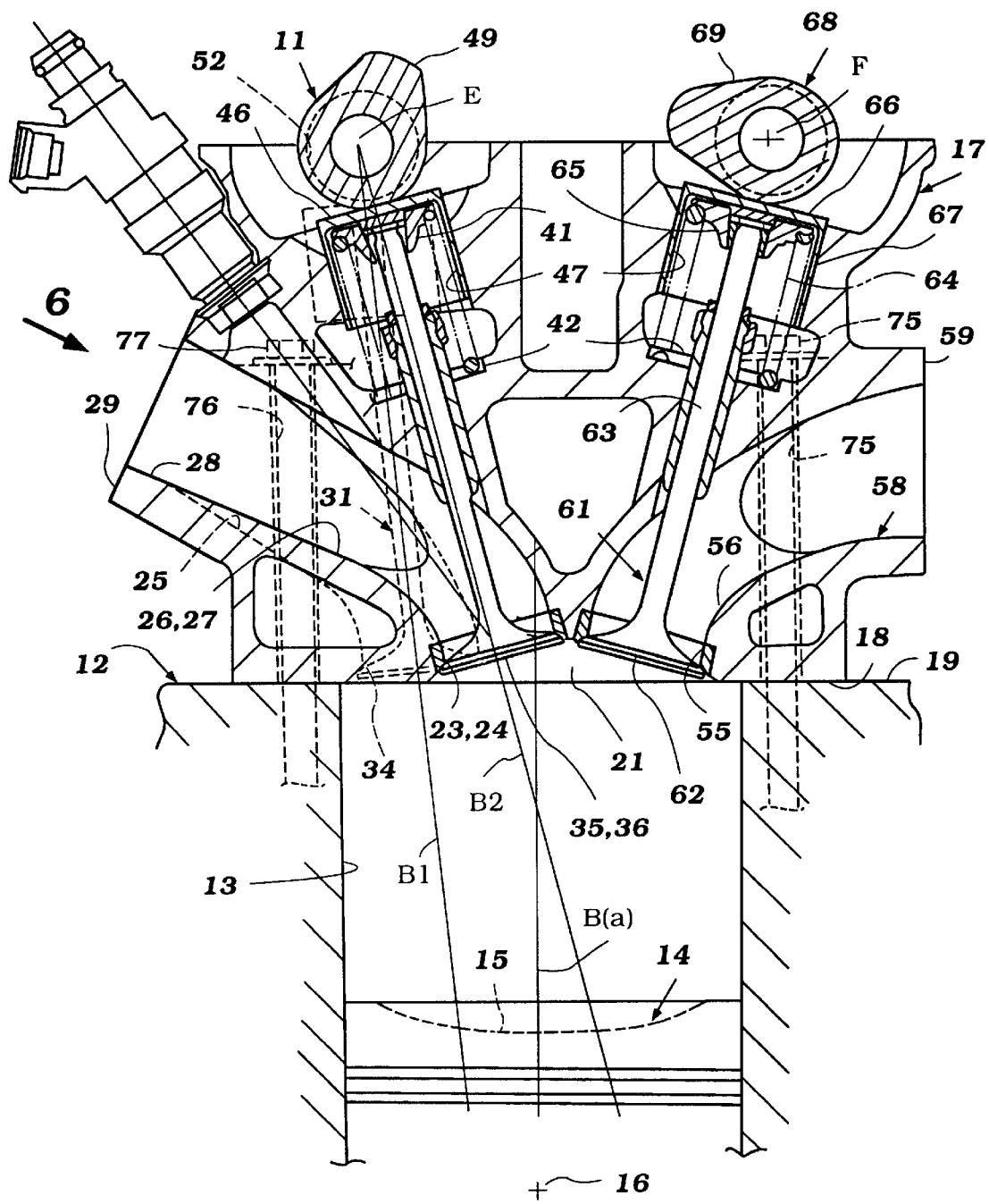
FIG. 1 is a cross-sectional view taken through a portion of an internal combustion engine constructed in accordance with a first embodiment of the invention along the line 1—1 of FIG. 3 and generally parallel to the axis of rotation of the engine crankshaft.

Referring now in detail to the drawings an internal combustion engine constructed in accordance with an embodiment of the invention is shown partially in the figures and as identified generally by the reference numeral 11. The invention is described by reference to a single cylinder of the engine 11, and it will be readily apparent to those skilled in the art how the invention can be practiced with multiple cylinder engines of varying configurations (i.e., in-line, v-type, etc). Also since the invention deals primarily with the combustion chamber and the induction and valving system associated with the cylinder head only the upper portion of the engine 11 has been depicted. Where components of the engine are not illustrated or described, they may be considered to be conventional.

The engine 11 includes a cylinder block 12 which may be formed any suitable material and which has a cylinder bore 13 formed therein. The cylinder bore 13 slidably receives a piston 14 which has a recessed bowl 15 formed in its upper end. The bowl has the shape of a segment of a sphere to form in part a combustion chamber, as will be described, which at top dead center has the shape of an optical lens (lens shaped). The piston 14 is connected to a crankshaft (not shown) which is supported for rotation in a well-known manner within a crankcase chamber formed at the end of the cylinder block 12 and which rotates about a rotational axis 16. The location of the rotational axis 16 is somewhat foreshortened in FIGS. 1 and 2 so as to represent a principle of the invention, as will be described.

The engine 11 is water cooled and for this purpose the cylinder block 12 is provided with a cooling jacket (not shown) through which liquid coolant is circulated in a well-known manner.

A cylinder head, indicated generally by the reference numeral 17 is affixed, in a manner to be described, to the cylinder block 12. This cylinder head 17 has a lower sealing surface 18 which is sealingly engaged with a cylinder head gasket (not shown) interposed between the cylinder head surface 18 and an upper deck surface 19 of the cylinder block 12. The cylinder head lower surface is formed with a recess 21 which is bounded by the sealing surface 18 and which cooperates with the head of the piston 14 and cylinder bore 13 to form the combustion chamber of the engine, the volume of which varies cyclicly as the piston 14 reciprocates in the cylinder bore 13. As noted above, the recess 21 and bowl 15 of the piston form a lens shape when the piston is at top dead center. This shape of combustion chamber reduces knock sensitivity.

The cylinder bore 13 has an axis B and this axis lies on a plane A which extends perpendicularly to the plane of FIG. 1 and which generally divides the cylinder head 11 into an intake side shown on the left hand side of FIG. 1 and an exhaust side shown on the right hand side of FIG. 1. The axis of rotation 16 of the crankshaft also lies on this plane. Three intake valves seats comprised of a center valve seat 22 and a pair of side valve seats 23 and 24 are affixed to the cylinder head 17 in the combustion chamber recess 21 in an appropriate manner, as by pressing inserts into place. These valve seats 22, 23 and 24 are formed at the termination of intake passages 25, 26 and 27, respectively, which are formed in the cylinder head 17 on its inlet side. These passages merge into a common intake port 28 formed in an external surface 29 of the cylinder head 17. In the embodiment the opening of the intake port is the surface 29 is oval, but as will be described other shapes are possible. An appropriate air charge and fuel charge, if desired, is supplied to the intake passages 25, 26 and 27 from an induction system (not shown). This induction system may be of any known type.

Three poppet-type intake valves comprised of a center intake valve 31 and a pair of side intake valves 32 and 33 cooperate with the valve seats 22, 23 and 24 so as to control the flow through them. These poppet-type valves 31, 32 and 33 have head portions 34, 35 and 36, respectively, that cooperate with the valve seats 22, 23 and 24 in a well-known manner.

Each poppet-type valve 34, 35 and 36 has a stem portion 37 that is supported for reciprocation within the cylinder head 17 by a pressed or cast in valve guide 38. The upper ends of the stems 37 have affixed to them keeper retainer assemblies 39 so as to retain one end of a coil spring assembly 41 in engagement with the valve stems 37. The opposite ends of the springs 41 bear against machine surfaces 42 of the cylinder head 17 so as to urge the intake valves 31, 32 and 33 to their closed position, as is well known in this art.

It should be noted that the reciprocal axis B-1 of the center intake valve 31 lies substantially at an acute angle to the plane A containing the cylinder bore axis B and substantially on a plane C perpendicular to the plane A and also containing the cylinder bore axis B. Thus, this center intake valve 31 is in fact on the center of the periphery of the cylinder bore 13 but spaced inwardly therefrom, for a reason to be described.

The side intake valves 32 and 33 have their axes of reciprocation B-2 lying in a common plane that is disposed at a greater acute angle to the plane B-A containing the cylinder bore axis B. These axes are disposed on opposite sides of the plane C. The axes B-2 are also disposed at acute angles θ to the plane C containing the cylinder bore axis B so that they intersect at a point E which is disposed below the head portion 15 of the piston 14 when in its bottom dead center position as shown in the figures and displaced toward the crankshaft axis 16.

This means that the intake charge which enters the combustion chamber from the respective intake passages 26 and 27 will not intersect with each other. As a result, this charge may be directed into the combustion chamber so as to create a slight tumble action. If it is desired to augment this tumble action there may be provided a tumble control valve of any of the types shown in the co-pending application of Yoshiharo Asaka, entitled "Tumble Control Valve for Intake Bore," Ser. No. 07/834,604, filed Feb. 12, 1992, and assigned to the assignee hereof, the disclosure of which is incorporated herein by reference. Alternatively, other types of tumble control valves may be employed for this purpose.

It should be noted that the intake passages 25, 26 and 27 have an downwardly inclined portion which intersects a curved portion which has its respective axis aligned with the respective axes B-1 and B-2 of the valve stems 37 of the respective valves 31, 32 and 33. In one specific preferred embodiment of the invention, the angle θ is approximately 2° (two degrees), but the choice of this angle will depend upon the other geometric relationships of the engine so as to ensure that the point B falls below the top dead center position 14 of the piston toward the axis of the rotation 16 of the crankshaft so as to achieve the aforenoted result.

Figure 4:
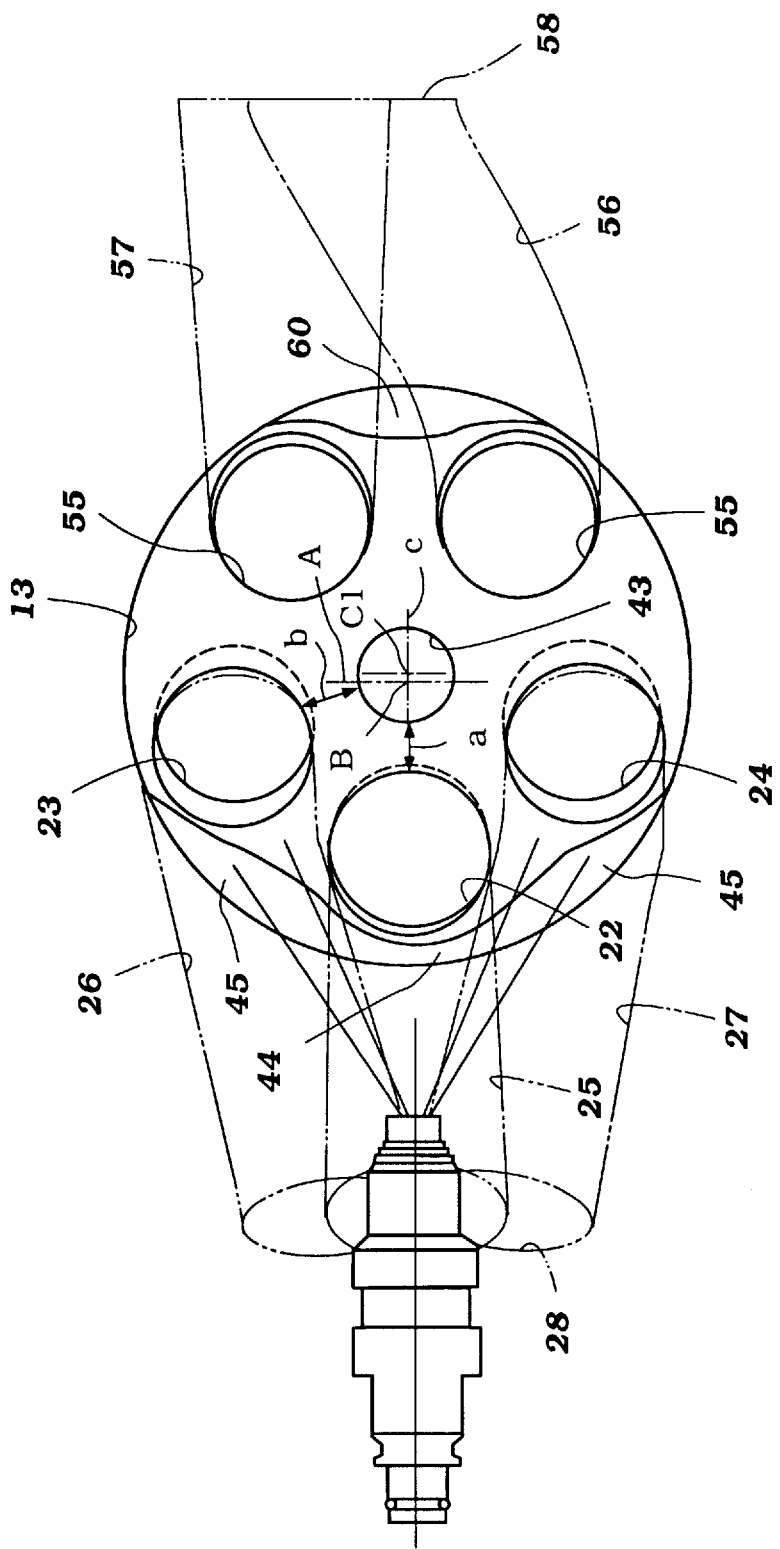
FIG. 4 is a bottom-plan view of the cylinder head showing the valve placement with the ports being illustrated in phantom.

As may be seen from FIG. 4, the center intake valve C-21 is at a lesser distance a to a spark plug receiving aperture 43 formed centrally in the combustion chamber with its axis c-1 being disposed slightly offset on the plane C from the cylinder bore axis B then the corresponding distance b from the side intake valve seats 23 and 24. This permits a squish area 44 to be formed in the outer periphery of the cylinder head allowing large squish areas 45 to be formed on the sides between the center intake valve 22 and the side intake valves 23 and 24 so as to promote a greater squish action and improve turbulence for improving low speed running and combustion. This offsetting of the center intake valve toward the cylinder bore axis B also permits, in addition to the squish action, a reduced combustion chamber volume and, accordingly, a higher combustion ratio.

Thimble-type tappets 46 are slidably supported within bores 47 formed integrally in the cylinder head 17 and which their axes extending generally parallel to the axes of the respective stems 37 of the intake valves 31, 32 and 33. Because the side intake valves 32 and 33 are skewed relative to the plane C, these bores 47 may be spaced from each other without intersecting each other. This also easily permits these bores to be formed in the cylinder head 17 rather than a separate cam carrier member which is fixed to the cylinder head 17 thus simplifying the machine operation for the cylinder head.

An intake camshaft 48 is rotatably journaled about an axis E within the cylinder head 17 in a manner to be described and has cam lobes 49 that cooperate with the thimble tappets 47 for operating them and the intake valves 31, 32 and 33 in a well-known manner. It should be noted that the common plane containing the axes B-2 of the side intake valves 32 and 33 and a plane containing the axis B-1 of reciprocation of the center intake valve 31 intersect at the point E which is coincident to the axis of rotation of the intake camshaft 48. Also it should be noted that this axis E is disposed inwardly from the periphery of the cylinder bore 13 as viewed in FIG. 1. The advantages of this construction will be described later. The intake camshaft 48 is driven at ½ crankshaft speed from the crankshaft by any suitable mechanism which may include a variable timing arrangement as disclosed in my copending application entitled VARIABLE VALVE TIMING ARRANGEMENT FOR INTERNAL COMBUSTION ENGINE, Ser. No. 08/138,034, filed Oct. 15, 1993, the disclosure of which is incorporated herein by reference.

As disclosed in that application, the control strategy for varying the intake valve timing may be altered from the optimum for a given running condition in response to the sensing of a knock or an incipient knocking condition so as to further improve the knock free running of the engine. As has been previously noted, the configuration of the combustion chamber, the intake porting and the tumble action achieved, all lend themselves to an engine that has a low tendency to knock. This performance can be further improved by using the variable valve timing arrangement as described in my copending application Ser. No. 138,034.

Figure 2:
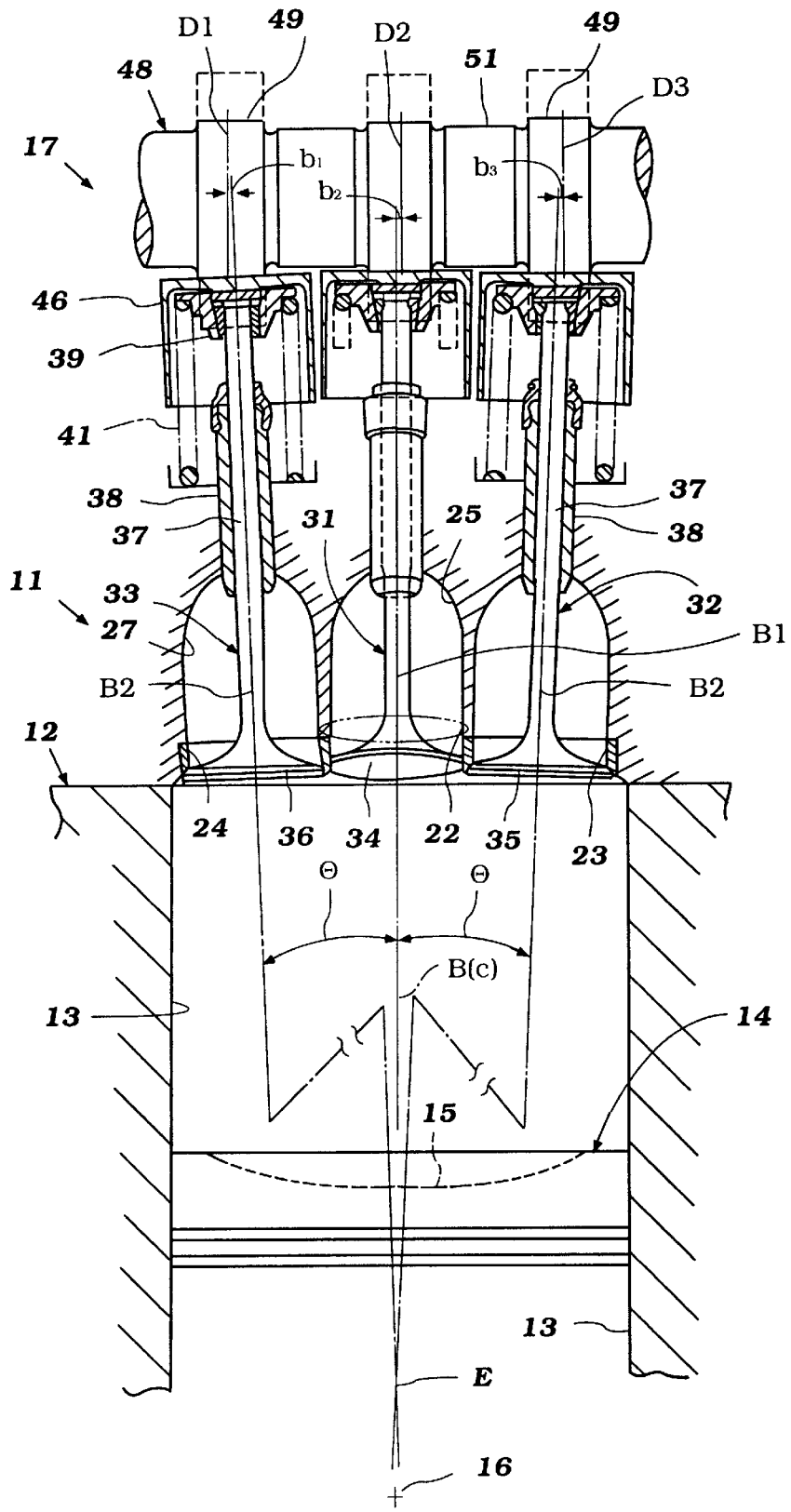
FIG. 2 is a cross-sectional view taken along a plane perpendicular to the plane of FIG. 1.

Even though the axis B-1 of the center intake valve 31 lies on the plane C, the cam lobe 49 associated with it has its center D-2 offset to one side by the dimension b-2 with this offset being toward the intake valve 32 as seen in FIG. 2. This slight offset gives a rotational effect to the tappet 46 which will cause it to rotate and minimize wear both on the tappet 46 and also on the cylinder head bore 47 and the intake valve 31.

Because the heads of the tappets 46 associated with the side intake valves 32 and 33 are at a small angle, the cam lobes 49 associated with the side valve operating tappets may be slightly tapered so as to minimize wear. In addition, the centers of these lobes D-1 and D-3 are offset to the distances b-i and b-3 from the centers of the tappets 46 so as to cause a rotational effect on these tappets for the same reason.

The intake camshaft 48 is provided with a pair of bearing surfaces 51 that are disposed between the lobe 49 for operating the center intake valve 31 and the lobes 49 that operate the side intake valve 32 and 33, respectively. These bearing surfaces are journaled within respective bearing surfaces 52 machined directly in the upper surface of the cylinder head 17. Bearing caps shown in phantom in FIG. 3 and identified by the Reference 53 are affixed to the cylinder head 17 by means of threaded fasteners which pass through holes 54 formed in the cylinder head 17 at locations disposed between the cam lobes 49. Again, these bearing surfaces 52 may be formed directly in the cylinder head 17, and thus avoid the separate cam carrier construction used with other types of five-valve-per-cylinder engines.

A pair of exhaust valve seats 55 are pressed into the cylinder head 17 on the side of the plane B opposite to the intake side. It should be noted that the valve seats 55 are offset from the plane A containing the cylinder bore axis B while this plane slightly intersects the intake valve seats 23 and 24. This offsetting tends to permit a higher compression ratio and a reduced combustion chamber volume so that there will be less surface quenching. The exhaust valve seats 55 are formed at the end of respective exhaust passages 56 and 57 formed in this side of the cylinder head and which are siamesed and form a common exhaust outlet opening 58 in an outer surface 59 of the cylinder head 17.

It will be seen that the exhaust valve seats 55 provide between them and the outer periphery of the cylinder bore 13 a further squish area 60 which is disposed opposite the squish areas 44 and 45 on the intake side but is disposed so that the squish effect will not be in direct opposition to the main squish action caused by the areas 44 and 45 so as to further improve the turbulence in the combustion chamber and flame propagation.

Poppet-type exhaust valves 61 have head portions 62 that cooperate with the valve seats 55 for opening and closing them. These exhaust valves have stem portions 63 that are supported within valve guides 38 pressed or otherwise fixed to the cylinder head assembly 17 and which define the reciprocal axes for the exhaust valve 64. These axes lie in a common plane that is disposed at acute angles to the plane A containing the cylinder bore axis B and which acute angle is less than the acute angle of the side intake valve 32 and 33 and greater than the center intake valve 31.

Coil compression springs 64 encircle the exhaust valve stems 63 and bear against keeper retainer assemblies 65 and cylinder head machine surfaces 42 for urging the exhaust valves 61 to their closed positions.

Thimble-type tappets 66 are slidably supported within bores 67 formed directly in the cylinder head 17 and are associated with the exhaust valves 61 for opening them. These thimble tappets 66 are operated by an exhaust camshaft 68 that is rotatable about an axis F which is parallel to the axis E of the intake camshaft 48 but which is spaced a greater distance from the cylinder bore axis B than the axis E. Cam lobe 69 on the camshaft 68 engage the thimble tappets 66 for operating them in a well-known manner.

The exhaust camshaft 68 is driven in a known manner and is provided with bearing surfaces disposed between the cam lobes 69 that are rotatably journaled within a bearing surface 71 machined in the cylinder head 17. Bearing caps are held to these bearing surfaces 71 as indicated in broken lines at 72 in FIG. 3 by means of threaded fasteners which pass through openings 73 formed in the cylinder head 17.

Figure 3:
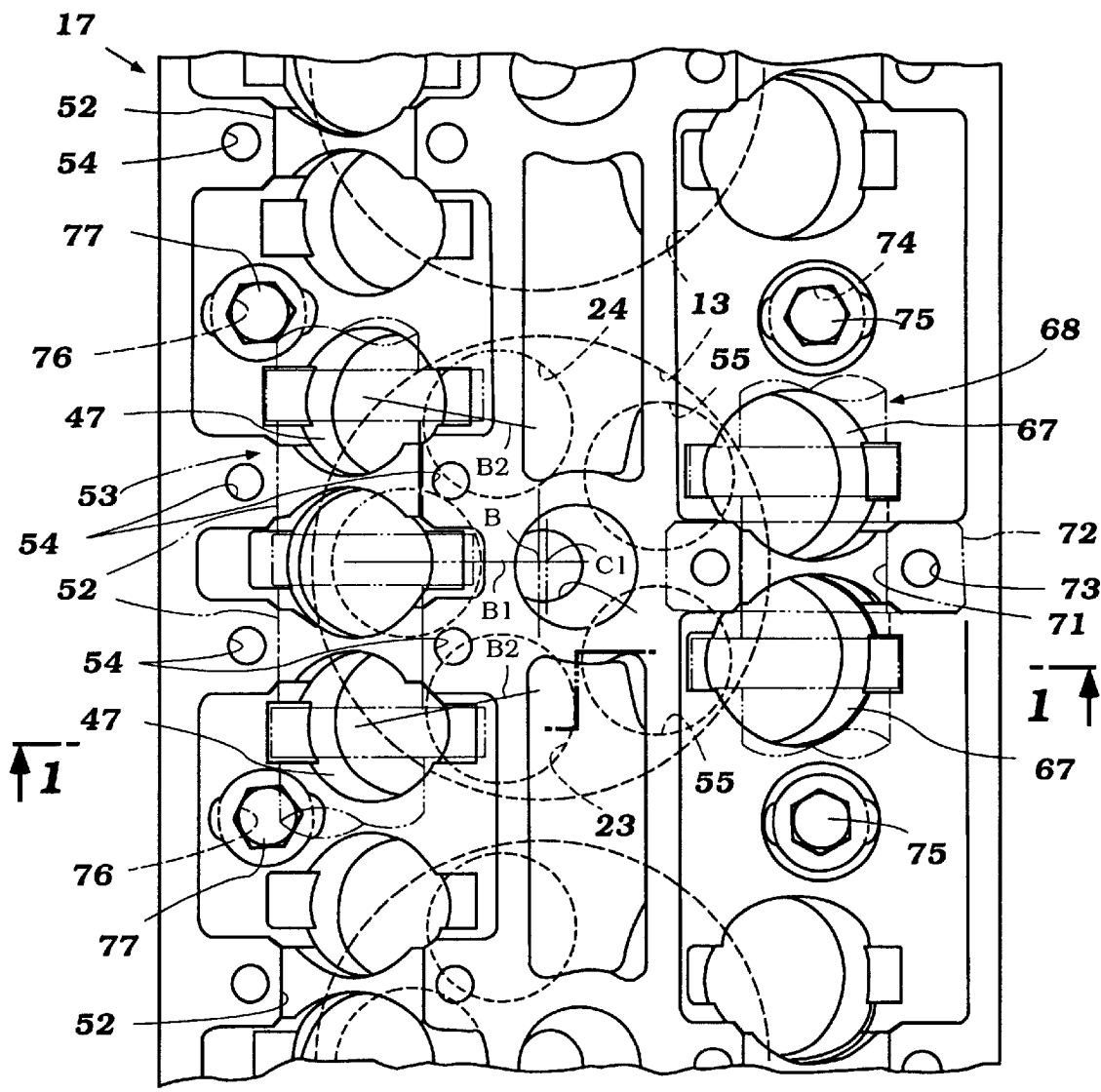
FIG. 3 is a top-plan view of the cylinder head with the camshaft, camshafts, tappets, valves and other components removed so as to more clearly show the construction.

It has been noted that the cylinder head 17 is affixed to the cylinder block 12 and the way in which this is done will now be described by primary reference to FIGS. 1 and 3. It will be seen that a pair of holes 74 are formed in the cylinder head 17 under the exhaust camshaft 68 on the exhaust side of the engine and these receive threaded fasteners 75 for cylinder head fold down purposes. In a similar manner, a pair of hold-down openings 76 are formed on the intake side of the cylinder head and these holes 76 are disposed at the same distance from the cylinder bore axis B as the hole 74 on the exhaust side. This is possible since the intake camshaft axis E is disposed inwardly thereof and hence threaded fasteners 77 may be freely inserted into the hole 76 for hold-down purposes without necessitating removal of the intake camshaft 48 and while maintaining uniform spacing. It should be noted that the hold-down hole 76 are basically aligned with and are at the same distance from the plane A as the bearing cap hole 54 so as to facilitate machining.

Figure 5:
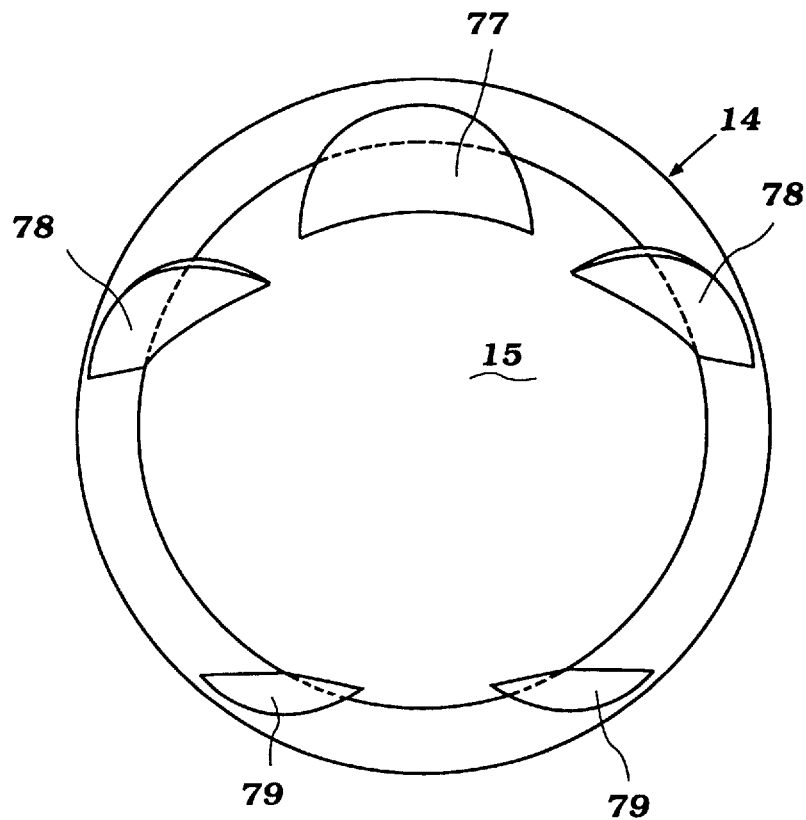
FIG. 5 is an enlarged top plan view showing the configuration of the head of the piston.
Figure 6:
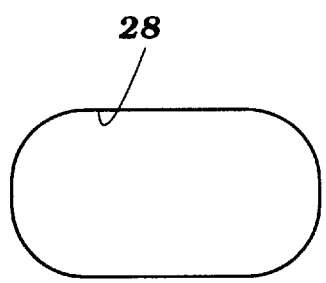
FIG. 6 is a view showing the configuration of the inlet opening of the intake passages and is taken generally in the direction of the arrow 6 in FIG. 1.

In order to permit the high compression ratio of the engine and still permit maximum valve lifts, the head of the piston 14 is provided with a plurality of recesses as shown in FIG. 5 so as to clear the respective valves. These recesses include a relatively large recess 77 for clearing the center intake valve 34 and a pair of shallower recesses 78 for clearing the heads of the side intake valves 35 and 36. In a similar manner, the opposite side of the piston head is provided with a pair of recesses 79 so as to clear the exhaust valves 62. These recesses 77, 78 and 79 extend in part into the bowl area 15.

Figure 7:
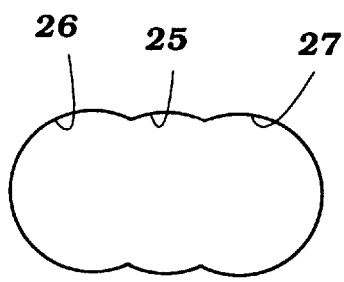
FIG. 7 is a view, in part similar to FIG. 6, and shows another alternative configuration for the inlet opening for the intake passages.

In the embodiment as thus far described the opening through the cylinder head surface 29 of the intake passage 28 has been oval in configuration. FIG. 7 shows another embodiment wherein the opening has a more curvilinear shape so as to correspond with the general configuration of the passage portions 25, 26 and 27 as shown in this figure.

It should be readily apparent from the foregoing description that the described construction permits a compact combustion chamber for achieving a high compression ratio without knocking and very effective induction system and cylinder head arrangement for a multiple valve engine. Knocking can also be avoided or reduced through the use of variable intake valve timing. This can be done through the use of a single cylinder head casting without requiring multi-piece construction and permits the positioning of the induction system so that the desired flow pattern can be achieve in the combustion chamber under all running conditions without interfering or intersecting flows from the various intake passages. Of course, this action may also be augmented under some running conditions by a tumble valve arrangement as described. Of course, the foregoing description is at a preferred embodiments of the invention and various changes and modifications may be made without departing from the spirit and scope of the invention, as defined by the appended claims.

I claim:

1. An internal combustion engine comprised of a cylinder block defining a cylinder bore in which a piston reciprocates, a crankshaft journaled for rotation about an axis at one end of said cylinder bore and driven by said piston, a cylinder head affixed to said cylinder block and enclosing the other end of said cylinder bore, a pair of intake passages formed in said cylinder head and terminating at a pair of valve seats lying on opposite sides of a first plane containing the axis of said cylinder bore and extending perpendicularly to the axis of rotation of said crankshaft, a pair of poppet valves supported for reciprocation about respective reciprocal axes by said cylinder head and having head portions for controlling the flow though said valve seats, said poppet valve reciprocal axes lying at acute angles to a second plane containing said cylinder bore axis and perpendicular to said first plane and at respective opposite acute angles to said first plane, said intake passages having portions that extend generally parallel to the reciprocal axes of the respective poppet valves adjacent the respective valve seats, said axes intersecting in said first plane at a point below the bottom dead center position of said piston so that the flow into said cylinder bore from said side intake valve seats does not interfere.

2. The internal combustion engine of claim 1, wherein the valve seats and intake passages are configured so as to generate a tumble action within the combustion chamber.

3. The internal combustion engine of claim 1, wherein the valve seats are formed in a recessed surface of the cylinder head which defines with the cylinder bore and the head of the piston the combustion chamber, said head of said piston having a recess so that the shape of said combustion chamber is that of a lens when said piston is at its top dead center position.

4. The internal combustion engine of claim 1, further including a third valve seat disposed substantially on the first plane and between the pair of valve seats and a third poppet valve which is supported for reciprocation about a respective reciprocal axis by the cylinder head and having a head portion for controlling the flow through said third seat.

5. The internal combustion engine of claim 4, wherein the reciprocal axis of the third valve lies substantially parallel to the first plane and at a lesser acute angle to the second plane than the reciprocal axes of pair of poppet valves.

6. The internal combustion engine of claim 5, wherein the reciprocal axis of the third poppet valve lies within the first plane.

7. The internal combustion engine of claim 4, further including a camshaft rotatably journaled by the cylinder head and actuating each of the poppet valves.

8. The internal combustion engine of claim 7, wherein the camshaft operates the poppet valve through respective thimble tappets and has a cam lobe for each of the poppet valves, the reciprocal axes of the poppet valves intersecting the axis of rotation of said camshaft.

9. The internal combustion engine of claim 8, wherein the valve seats are formed in a recessed surface of the cylinder head which defines with the cylinder bore and the head of the piston the combustion chamber, said head of said piston having a recess so that the shape of said combustion chamber is that of a lens when said piston is at its top dead center position.

10. The internal combustion engine of claim 8, further including an intake cam shaft driven by the crankshaft for operating said poppet valves, and means for varying the timing between said cam shaft and said crankshaft for precluding knocking.

11. The internal combustion engine of claim 8, further including a pair of cylinder head bolt threaded fastening means for affixing the cylinder head to the cylinder block, said cylinder head threaded fastening means lying transversely outwardly of the second plane from the rotational axis of the camshaft.

12. The internal combustion engine of claim 8, wherein the cam lobes engage the respective tappets at a point offset from the center of the tappets for exerting a rotational force on the tappets.

13. The internal combustion engine of claim 12, wherein the cam lobes associated with the tappets of the pair of valves have their centers disposed further from the first plane than the center of the respective tappets.

14. The internal combustion engine of claim 12, wherein the cam lobe associated with the tappet that operates the third poppet valve has its center offset from the first plane and the tappet actuated thereby has its center lying on the first plane.

15. The internal combustion engine of claim 14, wherein the cam lobes associated with the tappets of the pair of valves have their centers disposed further from the first plane than the center of the respective tappets.

16. The internal combustion engine of claim 15, wherein the third valve seat is disposed closer to the cylinder bore axis than the pair of valve seats for defining a squish area around the outer periphery of the valve seats.

17. The internal combustion engine of claim 16, wherein the valve seats are formed in a recess surface of the cylinder head which defines with the cylinder bore and the head of the piston the combustion chamber, said head of said piston having a recess so that the shape of said combustion chamber is that of a lens when said piston is at its top dead center position.

18. The internal combustion engine of claim 11, further including bearing surfaces formed on the camshaft between the cam lobes for rotatably journaling the camshaft in bearing surfaces formed in the cylinder head and bearing cap means affixed to said cylinder head and engaging said camshaft bearing surfaces for rotatably journaling said camshaft.

19. The internal combustion engine of claim 18, wherein the bearing caps are affixed to the cylinder head by at least a pair of threaded fastening means that are disposed at substantially the same distance from the second plane as the threaded fastening means for affixing the cylinder head to the cylinder block.

20. The internal combustion engine of claim 8, further including bearing surfaces formed on the camshaft between the cam lobes for rotatably journaling the camshaft in bearing surfaces formed in the cylinder head and bearing cap means affixed to said cylinder head and engaging said camshaft bearing surface for rotatably journaling said camshaft.

21. The internal combustion engine of claim 20, wherein the cam lobes engage the respective tappets at a point offset from the center of the tappets for exerting a rotational force on the tappets.

22. The internal combustion engine of claim 21, wherein the cam lobes associated with the tappets of the pair of valves have their centers disposed further from the first plane than the center of the respective tappets.

23. The internal combustion engine of claim 22, wherein the cam lobe associated with the tappet that operates the third poppet valve has its center offset from the first plane and the tappet actuated thereby has its center lying on the first plane.

24. The internal combustion engine of claim 23, wherein the cam lobes associated with the tappets of the pair of valves have their centers disposed further from the first plane than the center of the respective tappets.

* * * * *

UNITED STATES PATENT AND TRADEMARK OFFICE
CERTIFICATE OF CORRECTION

PATENT NO.   : 5,861,503
DATED        : January 9, 1999
INVENTOR(S)  : Jorge R. Barrio et al.

It is certified that error appears in the above-identified patent and that said Letters Patent is hereby corrected as shown below:

Title page,
Item [56], References Cited, OTHER PUBLICATIONS,
The first publication listed should read -- Substitution and Additions in the Heterocyclic Rings of Nucleic Acid Bases and Their Derivative—§II,.... --
Insert the following publications:

-- ZUPAN, M., "Functionalization of organic molecules by xenon fluorides," *Supplement D2: The chemistry of halides, pseudo-halides and azides,* Patai, S., et al. Eds: John Wiley and Sons: Chichester, U.K. 1995, Chapter 15, pp. 821-860.

UMEMOTO, T., ET AL., "Power and Structure-Variable Fluorinating Agents. The N-Fluoropyridinium Salt System," *J. Am. Chem. Soc.,* 1990, vol. 112, No. 23, pp. 8563-8575.

LAL, G.S., "Site-Selective Fluorination of Organic Compounds Using 1-Alkyl-4-fluoro-1,4-diazabicyclo[2.2.2]octane Salts (Selectfluor Reagents)," *J. Org. Chem.,* 1993, vol. 58, No. 10, pp. 2791-2796.

GAL, C., ET AL., "Activation of Tertiary Paraffins by Elemental Fluorine," *Tetrahedron Letters,* 1984, vol. 25, No. 4, pp. 449-452.

ROSEN, S., ET AL., "Activating Unreactive Sites of Organic Molecules Using Elemental Fluorine," *J. Org. Chem.,* 1987, vol. 52, No. 13, pp. 2769-2779.

ROZEN, S., "Elemental Fluorine as a 'Legitimate' Reagent for selective fluorination of Organic Compounds," *Acc. Chem. Res.,* 1988, vol. 21, pp. 307-312.

CECH, D., ET AL., "Preparation of Some 2'-Deoxy-5-Fluorouridine Derivatives By A Direct Fluorination*," *Collection Czechoslov. Chem. Commun.,* 1976, vol. 41, pp. 3335-3342.

PURRINGTON, S., ET AL., "The Application of Elemental Fluorine in Organic Synthesis," *Chem. Rev.,* 1986, vol. 86, No. 6, pp. 997-1018.

UNITED STATES PATENT AND TRADEMARK OFFICE
CERTIFICATE OF CORRECTION

PATENT NO. : 5,861,503
DATED : January 9, 1999
INVENTOR(S) : Jorge R. Barrio et al.

It is certified that error appears in the above-identified patent and that said Letters Patent is hereby corrected as shown below:

GRAKAUSKAS, V., "Direct Liquid-Phase Fluorination of Aromatic Compounds," *J. Amer. Chem. Soc.*, vol. 35, No. 3, pp. 723-728 (March 1970).

CACACE, F., ET AL., "Substrate Selectivity and Orientation in Aromatic Substitution by Molecular Fluorine," *Journal of the American Chemical Society*, 1980, vol. 102. pp. 3511-3515.

NAMAVARI, M., ET AL., "Regioselective Radiofluorodestanylation with [$^{18}$F]F$_2$ and [$^{18}$F]CH$_3$COOF: a High Yield Synthesis of 6-[$^{18}$F]Fluoro-L-dopa," *Appl. Radiat. Isot.*, 1992, vol. 43, No. 8, pp. 989-996.

NAMAVARI, M., ET AL., "Synthesis of 6-[$^{18}$F] and 4-[$^{18}$F]Fluoro-L-m-tyrosines via Regioselective Radiofluorodestannylation," *Appl. Radiat. Isot.*, 1993, vol. 44, No. 3, pp. 527-536.

MODESTO OROZCO, ET AL., "Quantum Chemical Study of the Electronic and Conformational Characteristics of Adenosine and 8-Substituted Derivatives: Functional Implications in the Mechanism of Reaction of Adenosine Deaminase," *Journal of Pharmaceutical Sciences*, vol. 79, No. 2, pp. 133-137 (2/1990).

MORRIS J. ROBINS, ET AL., "Nucleic Acid Related Compounds. 47. Synthesis and Biological Activities of Pyrimidine and Purine "Acryuclic" Nucleoside Analogues," *J. Med. Chem.*, 1984, vol. 27, 1486-1492, Issue No. 11.

VAN DER PUY, M., ET AL., "Controlled, Regiospecific Oxidation of Pyridine Carboxylic Acids and Esters With Elemental Fluorine" *Tetrahedron Letters*, 1988, vol. 29, N. 35, pp. 4389-4392. --

Column 2,
Line 61, after "F$_2$min" delete ")".

Column 3,
Line 15, replace "(<than 1%" with -- (< 1% --.

UNITED STATES PATENT AND TRADEMARK OFFICE
CERTIFICATE OF CORRECTION

PATENT NO.   : 5,861,503
DATED        : January 9, 1999
INVENTOR(S)  : Jorge R. Barrio et al.

It is certified that error appears in the above-identified patent and that said Letters Patent is hereby corrected as shown below:

Column 6,
Line 13, replace "tetraethylammonioum" with -- tetraethylammonium --.

Column 8,
Line 19, replace "Ng" with -- $N_9$ --.
Line 57, replace "carbarnoyl" with -- carbamoyl --.

Column 9,
Line 19, replace "aryloxyacetylaiio" with -- aryloxyacetylamino --.

Column 10,
Line 16, replace "farther" with -- further --.

Signed and Sealed this

Twenty-eighth Day of January, 2003

JAMES E. ROGAN
*Director of the United States Patent and Trademark Office*